United States Patent
Øllgaard (10) Patent No.: US 10,378,230 B2
(45) Date of Patent: Aug. 13, 2019

(54) ACCESS PANEL FOR A WIND TURBINE TOWER AND METHOD FOR SECURING SAME

(71) Applicant: Vestas Wind Systems A/S, Aarhus N. (DK)

(72) Inventor: Børge Øllgaard, Esbjerg (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 15/547,684

(22) PCT Filed: Jan. 27, 2016

(86) PCT No.: PCT/DK2016/050024
§ 371 (c)(1),
(2) Date: Jul. 31, 2017

(87) PCT Pub. No.: WO2016/124201
PCT Pub. Date: Aug. 11, 2016

(65) Prior Publication Data
US 2018/0030750 A1    Feb. 1, 2018

(30) Foreign Application Priority Data

Feb. 2, 2015  (DK) .................................. 2015 70061

(51) Int. Cl.
*E04H 12/00* (2006.01)
*F03D 13/20* (2016.01)
(Continued)

(52) U.S. Cl.
CPC ......... *E04H 12/003* (2013.01); *E06B 1/6046* (2013.01); *F03D 13/20* (2016.05);
(Continued)

(58) Field of Classification Search
CPC ....... E04H 12/003; E06B 1/6046; E06B 1/62; E06B 1/6015; F03D 13/20; F05B 2240/913; F05B 2240/912; B60J 10/70; B60J 10/30
(Continued)

(56) References Cited

U.S. PATENT DOCUMENTS 6,981,301 B2 *  1/2006  Medina ............... E04F 21/0015
                                              29/281.5
7,093,828 B2 *  8/2006  Murray ................... B25B 5/067
                                              269/3
(Continued)

FOREIGN PATENT DOCUMENTS

CN    101660485 A    3/2010
CN    201483408 U    5/2010
(Continued)

OTHER PUBLICATIONS

Danish Patent and Trademark Office, Examination Report in PA 2015 70061, dated Sep. 2, 2015.
(Continued)

*Primary Examiner* — Brian E Glessner
*Assistant Examiner* — Adam G Barlow
(74) *Attorney, Agent, or Firm* — Wood Herron & Evans LLP (57) ABSTRACT

A wind turbine tower access panel is disclosed and is removably fixable at a service aperture in a tower wall to thereby close the aperture. The access panel is generally planar and extends radially about an axis normal thereto. Additionally, the access panel includes a set of two or more fixing elements configured to securely fix the access panel in place at the aperture. Each fixing element includes an axial clamp, the clamp including an anchor fixed to the access panel, a clamping force adjuster and a clamp head having a
(Continued)

clamping surface. The clamp head includes a relatively deformable resilient material which deforms under an applied clamping load of the clamp thereby applying a clamping force to the tower wall.

20 Claims, 9 Drawing Sheets (51) Int. Cl.
    *E06B 1/60*     (2006.01)
    *F03D 80/50*     (2016.01)

(52) U.S. Cl.
    CPC .......... *F03D 80/50* (2016.05); *F05B 2230/60* (2013.01); *F05B 2240/912* (2013.01); *F05B 2240/913* (2013.01); *F05B 2280/5001* (2013.01); *F05B 2280/5011* (2013.01); *Y02E 10/728* (2013.01); *Y02P 70/523* (2015.11)

(58) Field of Classification Search
    USPC ............................. 52/208, 213; 269/266, 3, 6
    See application file for complete search history.

(56) References Cited

U.S. PATENT DOCUMENTS

| | | |
|---|---|---|
| 2007/0230039 A1 | 10/2007 | Koizumi et al. |
| 2010/0007153 A1 | 1/2010 | Wobben |
| 2010/0244348 A1* | 9/2010 | Castor .................... B25B 5/067 269/165 |
| 2010/0266420 A1 | 10/2010 | Rasmussen et al. |
| 2011/0219711 A1* | 9/2011 | Bagepalli .............. E04H 12/003 52/204.1 |
| 2011/0265389 A1* | 11/2011 | Pfleger ...................... E06B 7/16 49/493.1 |
| 2011/0265402 A1* | 11/2011 | Pfleger .................... F03D 80/00 52/213 |

FOREIGN PATENT DOCUMENTS

| | | |
|---|---|---|
| DE | 3504840 A1 | 8/1986 |
| DE | 102006043936 A1 | 3/2008 |
| DE | 102008035350 A1 | 2/2010 |
| DE | 102013207908 A1 | 10/2014 |
| GB | 2337538 A | 11/1999 |
| WO | 2009094991 A2 | 8/2009 |

OTHER PUBLICATIONS

European Patent Office, International Search Report and Written Opinion in PCT/DK2016/050024, dated Apr. 11, 2016.

Japanese Patent Office, Notification of Reasons for Refusal in JP2017-558616, dated Aug. 21, 2018.

China National Intellectual Property Administration, First Notification of Office Action in CN Application No. 201680016884.7, dated Sep. 28, 2018.

\* cited by examiner

ACCESS PANEL FOR A WIND TURBINE TOWER AND METHOD FOR SECURING SAME

This invention relates to an access panel and to a method for securing an access panel at an aperture in a wind turbine tower wall. In particular, the invention relates to a removably fixable access panel at a wind turbine tower wall and to a method for securing same.

Figure 1:
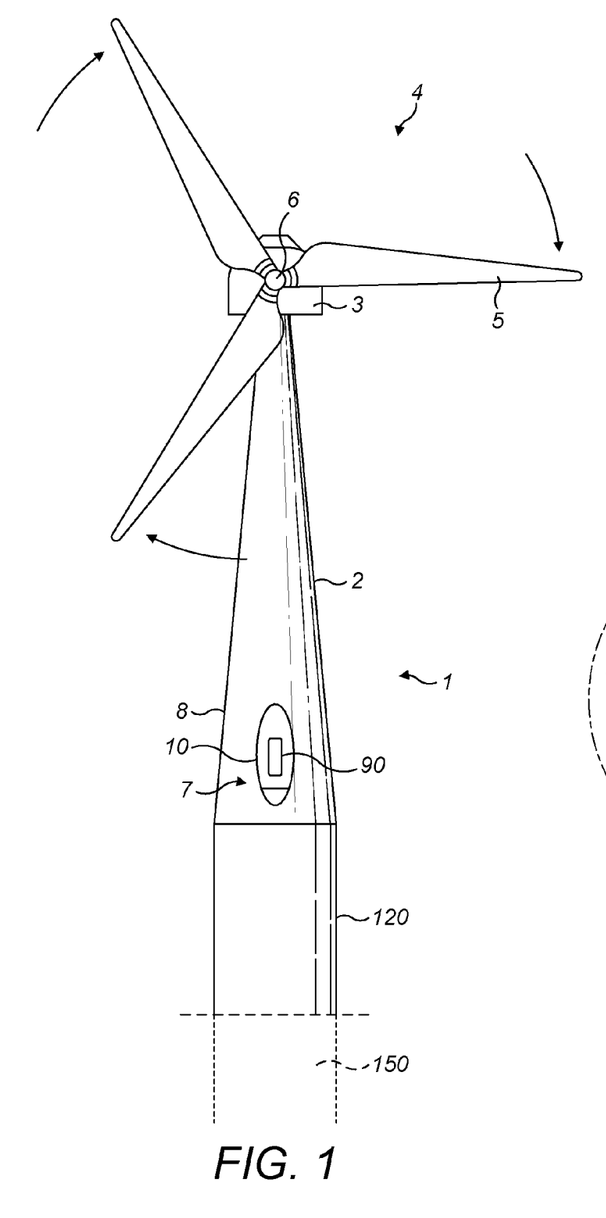
FIG. 1 shows a schematic illustration of a wind turbine including a schematically illustrated access panel.

A horizontal axis wind turbine is illustrated in FIG. 1 to which reference should now be made. Schematic FIG. 1 illustrates a wind turbine 1, comprising a wind turbine tower 2 on which a wind turbine nacelle 3 is mounted. A wind turbine rotor 4 comprising at least one wind turbine blade 5 is mounted on a rotor hub 6.

The hub 6 is connected to the nacelle 3 through a shaft (not shown) extending from the nacelle front. The nacelle 3 can be turned, using a yaw drive positioned at the top of the tower 1, to change the direction in which the rotor blade hub 6 and the blades 5 are facing. The blades are aerodynamically profiled so that they experience a 'lift' or pressure from the wind as the wind flows past the surface of the blade. The angle or pitch at which the leading surface of the blade aerodynamic profile meets the incident wind can be altered using a pitch drive, which turns the blades 5 with respect to the hub 6 thereby adjusting the "lift" achieved by the blades and thereby also the rotational driving force on the rotor for any given wind speed.

The wind turbine illustrated in FIG. 1 may be a small model intended for domestic or light utility usage, or it may be a larger model. Some large models in particular may typically be installed in large scale electricity generation on a land based or offshore wind farm. A typical commercial wind turbine, for example one that is designed to generate around 3 MW of power, can stand approximately 100 meters high and have wind turbine blades with a length of around 40 m or more. The size of the wind turbine blade, and in particular the area that is swept out by the blades as they turn in the wind is linked to the amount of energy the turbine can extract from the wind. In commercial energy generation wind turbines are therefore large so that they provide the greatest generation capacity. On- and offshore wind turbines are also known, with larger rotor diameters in the range between 140 and 180 meters. Some of these models, especially offshore models can generate around 8 MW of power. On- and offshore Tower heights above 80 or 100 meters are becoming increasingly commonplace, even extending to heights of 140 meters or more for very large turbines or for turbines whose rotors need significant ground clearance in order to avoid possible local turbulence effects in wind passing close to the ground.

In normal operation such as during power generation, the yaw drive turns the nacelle 3 so that it points the rotor hub 6 into the wind and the pitch drive adjusts the blades 5 of the wind turbine so that they are positioned with an angle of attack which creates lift and causes the rotor 4 to turn. The pitch of the blades can then be adjusted so that they force they experience from the wind is maintained within safe operating parameters, while generating as much energy from the incident wind as possible.

A turbine tower 2 serves multiple purposes. First, it provides a yaw and support platform for a nacelle 3 and blade rotor 4 at such a height that the rotor is clear of the ground and is as much as possible positioned in laminar air currents at the installation location. As such, the tower must possess the requisite structural strength to sustain the rotor and nacelle in position, even under extreme wind or weather conditions. Moreover, considering the dynamic nature of the turbine and of the weather, the tower must be able to perform its functions in spite of mechanical vibrations or oscillations visited on it and this, for the lifespan of the turbine 1 which may be twenty, twenty five or more years. A tower 2 may provide, near its base, an anchoring region positioned and fixed on a foundation. Foundations on land may typically consist in a mass of cast concrete embedded in the land surface or placed on rock formations. Offshore foundations such as the one illustrated in FIG. 1 can take a wide variety of forms Two common forms include monopile 150 and jacket foundations which latter type resemble a platform construction. In certain constructions, especially in offshore tower constructions, the tower 2 may include a base region connectable or connected to a foundation such as a monopile foundation 150 or jacket foundation and sometimes known as a transition piece 120. In addition, the tower 2 houses certain wind turbine components, typically those elements which relate to turbine control, servicing or to power transmission from the turbine to the grid. These parts along with the nacelle or rotor etc. need to be serviced from time to time, thereby necessitating access by service personnel. The need to provide access into a tower 2 for personnel can pose a problem in relation to the structural properties of the tower wall. This is especially so since the access locations for service personnel are likely to be at the tower base, namely precisely at the location where the highest loads and stresses act on the tower.

In WO2009094991 there is disclosed a substantially oval doorframe in a tower wall, within which doorframe is arranged a casement incorporating a doorway with a door and also incorporating two ventilation apertures with venting elements, one above and one below the doorway. All these elements are arranged within the extent of the doorframe which is arranged in the form of a coaming through the tower wall, extending both internally and externally of the wall. The doorframe coaming is substantial and oval shaped (when seen in plan view) in order to mitigate for weakening of the tower wall by the provision of access therethrough.

In large turbines, especially larger land-based turbines and offshore turbines, some components located in the tower can be very large and bulky, and sometimes extremely heavy: of the order of several tonnes or tens of tonnes. Moreover, in very large turbines such, some components which would ordinarily be placed in the nacelle 3 may be too large or too heavy for the nacelle, and may therefore instead be positioned inside the tower 2, sometimes at its base region, possibly in a transition piece region 120 of a tower. Thus, in addition to service personnel requiring access to the tower 2 or turbine 1 from time to time, larger towers 2 may advantageously also be dimensioned to allow large turbine components to be brought inside the tower, and should preferably also allow occasional removal of large components for servicing, repair or replacement. In view of the need to move large elements in or out through the tower, it can be useful to provide a correspondingly large access panel 10.

In DE102008035350, it has been suggested to provide an access aperture through a tower wall, which aperture is sufficiently large to allow introduction or removal of a wind turbine transformer. To that end, there is proposed a closure plate, larger than the aperture, and removably bolted to the tower wall by means of holes around the plate edge and all around the tower aperture edge. The closure plate encompasses a heavily thickened doorframe portion for an additional, smaller, personnel entrance door.

The provision of holes in the tower wall proves detrimental to its structural strength, in particular in the case of steel tower walls. Also, significant welds around a steel tower wall aperture can considerably weaken a tower. Both welds or holes may in particular generate significant local stress concentrations which may precipitate structural failure under conditions in which a plain wall without these features would maintain its integrity. This is a sensitive issue because a wind turbine tower can be expected to need to withstand extraordinary loads multiple times during its lifetime without failing. It is sensitive also because, especially when steel plate or sheet material is used as the tower wall construction material, the added cost of providing thicker steel plate, able to withstand extraordinary loads even when it is welded or pierced with multiple bolt-holes, can be considerable. Moreover, the rugged connection arrangement for the access panel shown in DE102008035350 would tend to scuff or otherwise damage a protective paint surface coating, possibly necessitating repainting with protective paint after each assembly of the access panel. This type of paint work may be very awkward and unsatisfactory to perform in situ.

There remains a need to provide access to the inside of a wind turbine tower, even while avoiding weakening of the tower structure. Moreover, there is a need for improved convenience relating to access through the tower wall for moving large components or equipment.

SUMMARY OF THE INVENTION

According to the invention, there is provided a wind turbine tower access panel incorporating axial clamping elements having a deformable clamp head. These allow secure, removable attachment of the access panel to a service aperture in a wind turbine tower wall without damaging or weakening the wall. The invention is beneficial in the context of wind turbine towers having steel walls. The invention is also beneficial in the context of steel walls with protective or weatherproof coatings applied thereto.

A service aperture in the context of the invention is intended to denote an aperture large enough for access by service personnel. In embodiments, a service aperture may be significantly larger, large enough to allow access for large pieces of equipment too large for passage through a personnel service door. In such cases, an access panel may preferably incorporate an auxiliary door in the form of a regular access door for service personnel, the access panel being dimensioned considerably larger than an auxiliary door, thereby to allow access for large turbine components, too big to pass through a service personnel door.

In particular, the invention comprises a removably fixable wind turbine tower aperture access panel being generally planar and extending radially about a closure axis normal thereto. The access panel comprises a set of fixing elements configured to securely fix the access panel in place. According to the invention, each fixing element comprises an axial clamp including an anchor fixed to the access panel, a clamping force adjuster and a clamp head with a clamping surface. Preferably the access panel of the invention may comprise more than two such clamps, preferably at least six or more or eight or more or ten or more, depending on the overall size of the access panel. Preferably the clamp head is connected directly or indirectly to the anchor. In embodiments, the clamping force adjuster may extend between said anchor and said clamping head. An axial direction in the present context denoted a direction parallel to or coincident with an axial direction through said aperture and normal to said aperture plane or normal to said access panel. A reference to a radial direction denotes a direction extending radially from a centre axis passing through said aperture or said access panel, i.e. normal to the axial direction, or generally parallel to the plane of the access panel or aperture. The main axis of said access panel or said aperture may be called a closure axis.

The clamping surface of the clamp is configured to contact and interact with the tower wall when the clamp is fixed in its attachment position. According to the invention the clamp head comprises, or is made from, a highly resilient material which deforms under an applied clamping load of the clamp thereby applying a clamping force to the tower wall. By providing a clamp head incorporating a clamp head material which is both relatively deformable and highly resilient, and which deforms under the force of the clamp, the substantially rigid turbine tower wall material remains undamaged by the fixing of the access panel while nevertheless being securely fastened thereto. The term "relatively deformable" in this context is intended to denote a group of materials, which may be non-metallic and/or non-ceramic and which may exhibit properties approximating to relatively stiff elastomers such as vulcanised elastomers or tough thermoplastics materials such as polyamides. Preferably, the deformable clamp head material may have an elastic modulus less than 12 GPa. This maximum level of elastic deformability has been found to be effective both at preventing damage to a wall such as a steel wall and also to provide a good fixing connection to the wall.

In preferred embodiments, the clamp head has a clamping surface which surface contacts the tower wall during a clamping action of the clamp at the tower wall aperture, the clamping surface being of the aforementioned deformable resilient clamp head material.

In embodiments, a resilient, deformable clamp head material having an elastic modulus less than 10 GPa or 8 GPa may be preferred. In particular, resilient deformable clamping head materials comprising plastics materials may be advantageous in the context of the invention. Such materials may exhibit an elastic modulus below 6 GPa.

In order to further enhance the protective properties of the clamp head towards the tower wall aperture, the clamp head surface may preferably comprise the aforementioned deformable clamp head material.

In further advantageous, optional aspects, the clamp head surface material may preferably have a Shore D hardness less than 95 and/or a Rockwell R hardness less than 130. This feature ensures that the clamp head will not tend to scratch the surface of a tower wall. In cases where a weatherproof coating is applied to tower walls, a small scratch can cause corrosion and consequent weakening of the wall. If detected, the scratch would require potentially costly repairing and maintenance to be carried out to fix any corrosion damage or weatherproofing damage. If undetected, the tower may be more prone to failure under extreme conditions. With an expected wind turbine lifetime typically between twenty and thirty years there is significant scope for small blemishes to become critical. This applies all the more so where the external environment is more aggressive, such as in offshore environments.

In further aspects, a clamp head may exhibit a dimensionally enlarged, distal claw portion. The term 'distal' here means a portion of the clamp head relatively further from the access panel. A distally enlarged claw may in particular be shaped to form a flange, in particular, a flange which is capable of extending radially over and beyond an edge of a tower wall aperture when the access panel is in position. In this way a claw surface of the flanged portion may extend over the edge and contact the tower wall aperture interior surface.

In further aspects, a clamp head may exhibit a dimensionally reduced proximal waist portion, preferably capable of abutting against a portion of the interior face of a tower wall aperture when in a clamping position. The waist portion may comprise an axially extending first surface and an axially tapered second surface. The axially extending first surface may in particular be capable of abutting against the interior edge face of a tower wall aperture when the clamp is in a fixing position. This arrangement may in particular hold the access panel in a seating position inside the tower wall aperture.

In order easily and reliably to ensure a correctly seated access panel, the waist portion may comprise a second, tapered surface at a region proximal to the first axial surface such that, upon progressively closing the clamp with the access panel placed in a tower wall aperture, the tapered surface contacts and progressively rides over an edge of the tower wall aperture. In doing so, the clamp head and a local portion of the access panel may be nudged radially inward until the first axial surface is aligned with and contacting the inside face of the tower wall aperture. This arrangement ensures easy seating of the access panel in its intended position for closing the service aperture merely by tightening the clamps.

In a further aspect, the clamp head may comprise or be made from a single piece, shaped to include a distal enlarged flanged claw portion and a proximal reduced waist portion. The single piece may in particular be made from the aforementioned deformable resilient clamp head material. The enlarged, distal claw portion of the single piece may advantageously exhibit the clamping surface of the clamp head. In this way, a single material having the requisite elastic properties and surface hardness properties may be used for all or major parts of the clamp head.

A clamp head is preferably shaped and positioned in a fixing element such as to enable an axial pulling force to be applied to a radially inward region of the clamp head while the clamp head transmits a pushing force against an immovable tower wall aperture interior surface through a portion of the clamp head which is located or positioned radially outward of the point of application of the pulling force. As such, a pushing force may be applied to a tower wall aperture interior surface, in particular at a location radially outward from the point of application of the pulling force. The clamp head may thereby be partially compressed by the mechanism of the axial clamp and also subject to shear forces by virtue of the position of the tower wall aperture, against which the clamp head is urged. A landing pad or a series or landing pads or one or more landing strips may be applied to the interior surface of the tower wall aperture to protect it from friction damage by the application of a clamping force. Such pads may preferably be made from a plastics material such as a Nylon™ or other resilient, smooth-surfaced materials.

In preferred embodiments the clamp head may be axially adjustable in relation to an anchoring point on the access panel or part thereof. This arrangement may preferably allow a separation distance between a clamp anchoring point on an access panel portion and the relevant clamp head to be axially varied by means of an adjuster. In this context, the axial variation is in a direction or comprises a component in a direction along or parallel to the axis normal to the plane of the access panel. In some embodiments, the fixing elements such as axial clamps may be removably connectable or securable to the access panel or to portions thereof. This will for example enable exchange or replacement of fixing elements or parts thereof if required. In embodiments at least an anchor or anchor point of a fixing element may be permanently connected to a portion of the access panel such as by welding or by forming as an integral part of the access panel.

In still further aspect, the clamp head may exhibit rotational symmetry about a central axis thereof. Preferably, a central axis of rotational symmetry of a said clamp head runs parallel to the main axis of said access panel. The clamp head may thereby enable a desired seating of the access panel irrespective of its momentary rotational orientation about its central axis. Preferably the clamp head may comprising an axial bore therethrough. Preferably, the axis of rotational symmetry may pass along and through said axial bore. In aspects, the aforementioned adjustable shank may pass through an axial bore in said clamp head.

In preferred aspects, the clamp may be configured to apply a shearing force action to said clamp head during a clamping action of the access panel. Preferably, the clamp force adjuster is adjustable or positionable to impart a biasing force to the clamp head. Preferably, in embodiments, the clamp force adjuster may comprise a shank having an effective length between the clamping head and an anvil of the axial clamp. Optionally, the shank may be connected to the clamp head at one end thereof. Optionally, the shank may be connected to an anvil element fixed to the access panel. In embodiments, the anvil may be coincident with the anchor. Preferably, the clamping force adjuster further comprises an actuator capable of varying the effective length of the shank. Adjusting the effective length of the shank between an anvil or anchor and a clamp head may thereby vary the clamping force applied to the clamping head. In aspects, a separation distance between the clamp head and the anchor is axially adjustable, preferably by means of said clamp force adjuster.

In aspects, and in order better to ensure an effective clamping effect while preserving the integrity of the tower wall and its surface, the deformable resilient clamp head material may preferably have a shear modulus less than 10 GPa, still preferably, less than 8 GPa or less than 6 GPa.

In aspects, the resilient clamp head material may be made from a non-metallic material or a non-ceramic material. In preferred aspects, the deformable clamp head material may comprise a plastics material having a shear modulus less than 6 GPa and an elastic modulus less than 4 GPa. In aspects, the deformable material of the clamp head is or comprises a Nylon™ material or another polyamide material. In other aspects, the deformable material of the clamp head may comprise rubber or vulcanised rubber or synthetic rubber. Many other materials may optionally be envisaged, provided these meet the relevant physical requirements as defined essentially or optionally herein.

In the present context, suitable values for Elastic Modulus or Shear Modulus of respective materials may be determined with reference to data tables of material properties. In particular, or in cases of doubt as to the values relating to particular materials, applicable values for these parameters may appropriately be obtained using relevant ISO testing methods applicable on 31 Dec. 2014.

The size of an access panel can vary although in larger turbines, these may extend in a height dimension up to around six or eight meters or more with a width of up to two meters or more. As such, these panels, being large and therefore also heavy can pose a challenge to put in place or to remove when required. Weather considerations may also need to be taken into account such as winds, which can preclude or at least seriously complicate application (closure) or removal (opening) operations. As such, the need both to support and to accurately locate an access panel such as shown in DE102008035350 or in WO2009094991, at its corresponding tower aperture is difficult and in some conditions, impossible. In offshore locations, the operation may be more difficult still. In order to facilitate insertion and correct seating of the access panel in a tower wall aperture, the access panel may optionally comprise a main panel and a separate sub-panel, the main- and sub-panels being configured for separate positioning into or removal from a said tower aperture. In this way, the sub-panel may be fixed in position a tower aperture independent of said main panel. Being of smaller dimensions, the fitting of the sub-panel may be more easily carried out than positioning and fixing an entire access panel. Moreover, the sub-panel position in the tower aperture may be adjusted to conform to a predetermined bearing position. Thereafter, a main panel may be easily inserted in position in a tower wall aperture, with a reference surface thereof abutting a bearing surface of the sub-panel. Consequently, the main panel may be immediately correctly located in the aperture without requiring further positional adjustment. Given its larger dimensions, this considerably facilitates its insertion and also its removal and re-insertion in case the aperture is used for passing large components into or out from the tower. Therefore, in aspects of the invention, the sub-panel and main panel may be connectable along a common seam, which common seam may be comprised of a bearing surface of the sub-panel and a co-operating reference surface of the main panel.

In a further aspect, the invention may comprise a wind turbine tower having a service aperture in which an access panel as described or defined herein is removably located. Preferably, the tower aperture is fully closed by said access panel. Preferably, the tower aperture is provided in a tower wall at or near a base region of the tower. A base region may be a region near the ground or near a foundation such as a rock or ground foundation or an offshore foundation such as a jacket or monopile. In embodiments, the base region in which the tower aperture is located may be a transition piece of an offshore turbine tower between a monopile or jacket and a tower structure.

Preferably the tower walls are made of steel plate. The steel may preferably have a thickness above 25 mm, still preferably above 30 mm, more preferably above 40 mm or above 50 mm. Preferably, the tower has a tower top region and a tower base region and comprises a longitudinally extending generally cylindrical wall having a cylinder diameter which progressively decreases in a direction from the base region towards the top region. The tower wall may have a wall thickness which progressively decreases in a direction from the base region towards the top region. The tower thereby defines an interior region within the wall and an exterior outwith the wall. The aperture preferably extends radially in the wall about an axis normal thereto and is dimensioned to allow passage therethrough of personnel and equipment between the exterior and interior region.

Optionally, the access panel at the tower may comprise an auxiliary door aperture dimensioned to allow passage of service personnel between the interior region and the exterior. The door aperture may be fully encompassed within the access panel or within a single sub-panel thereof. The tower may be fixed to a base foundation or plinth and may be an on- or off-shore tower. Optionally, the tower wall thickness may be substantially constant around the entire aperture.

Preferably, the tower wall at a region adjacent said aperture (e.g. within 1 m of the aperture) comprises neither through-holes nor structural welds. In this context, a structural weld is a weld which directly or indirectly supports the weight of the access panel or at least a substantial part of it. The tower wall may have a weather- and waterproof painted surface extending over substantially all the exterior region of the wall adjacent the aperture. Preferably, the painted surface extends all around an inner rim of the aperture and preferably the painted surface extends about substantially all of an interior wall region adjacent the aperture.

In accordance with the invention, the set of fixing elements of the access panel securely fix the access panel in place at said aperture without requiring holes in or through the tower wall and/or welds in or on it. Preferably therefore, the function of fixing the panel is fulfilled solely by fixing elements which do not rely on holes in and/or welded elements at or on the tower wall.

In aspects, the invention comprises a method of fixing an access panel according to the present invention to a tower according to a service aperture through a wall of a wind turbine tower, the method comprising placing the access panel fittingly in the aperture and applying an axial clamping force between it and the tower wall aperture by operating the clamping force adjuster of the access panel, such that the access panel is securely fixed to the tower wall aperture without damaging it tower or a coating thereon. Further optional features of the method are descried or defined herein. According to one aspect, the method may include placing a sub-panel of the access panel in the aperture and radially adjusting its position in the aperture. Thereafter, the method may include fixing the sub-panel in position and thereafter placing a main panel of the access panel in the aperture such that a main panel reference surface abuts a sub-panel bearing surface, and then fixing the main panel in position.

BRIEF DESCRIPTION OF THE DRAWINGS

The invention will now be described in more detail, and by way of non-limiting examples, with reference to the not-to-scale, figurative drawings, in which.

DESCRIPTION OF EMBODIMENTS OF ASPECTS OF THE INVENTION

Figure 1A:
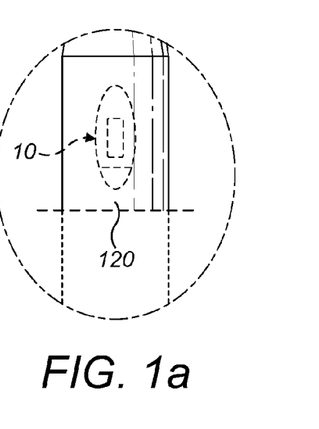
FIG. 1a shows an alternative detail.
Figure 2A:
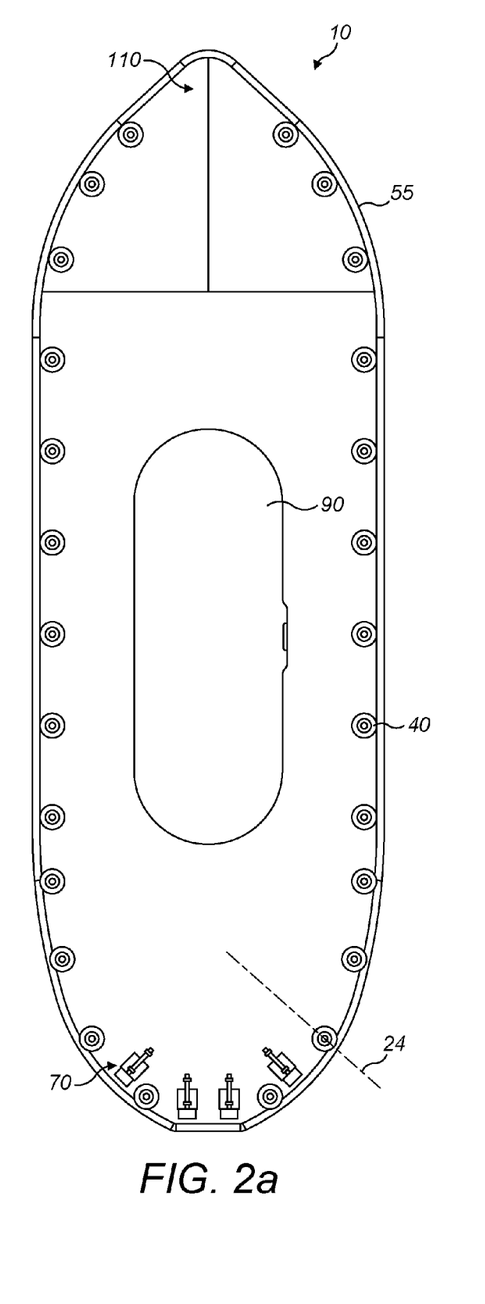
FIGS. 2a and 2b show a rear and a side view of an access panel according to aspects of the invention.
Figure 2B:
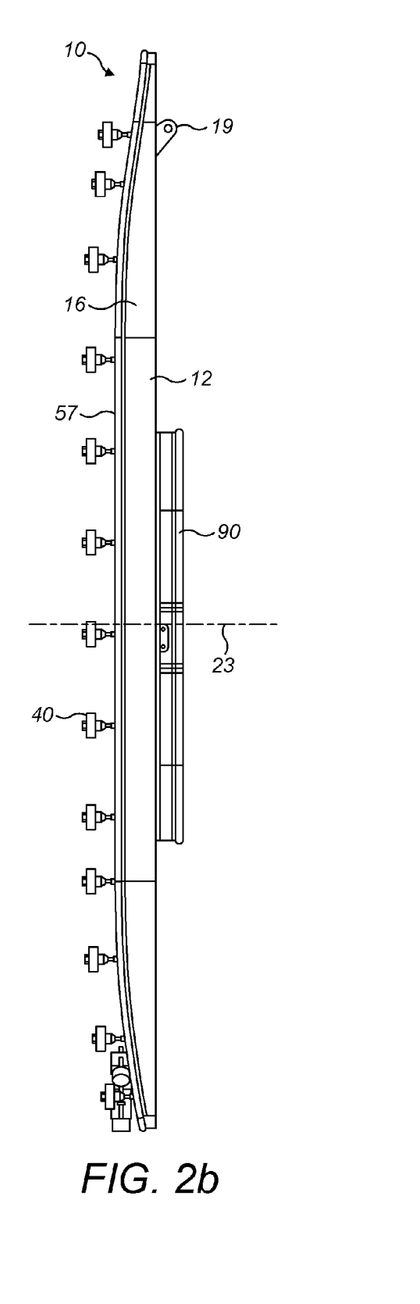
Figure 3:
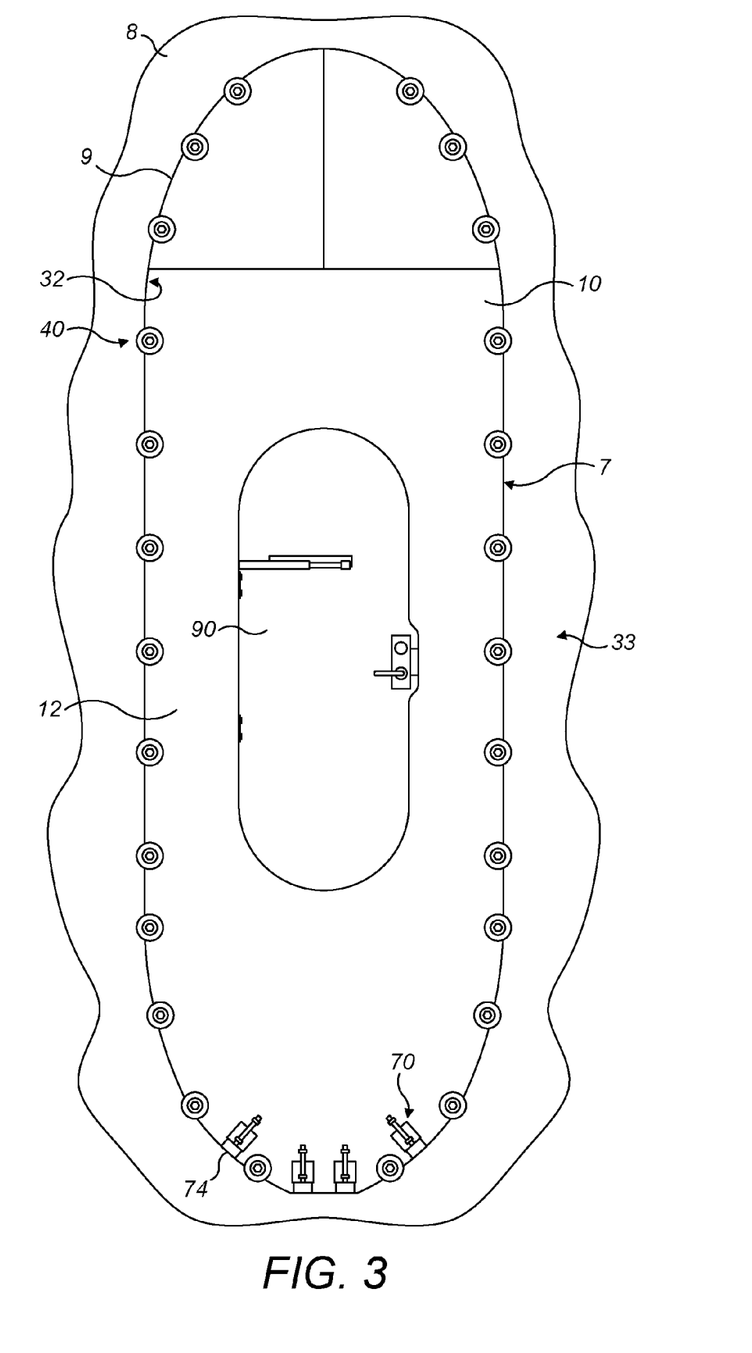
FIG. 3 shows an interior view of an access panel in position at a tower aperture according to aspects of the invention.

The tower 2 illustrated in FIG. 1 is shown with a schematically indicated access panel 10 according to aspects of the invention and fitted over a service aperture 7 in the tower wall 8. In FIG. 1, the service aperture is provided in a base region of the tower 2. In FIG. 1a, the service aperture 10 is shown in a transition piece 120, also known as an intermediate segment, which may connect the tower to a jacket or to a monopile type foundation 150 suggested in the illustration in dotted lines. For the purposes of this disclosure, a base region of a tower may be deemed to include a transition piece or intermediate segment 150. In some aspects, an external platform may be provided in a base region of a tower 2, as suggested in FIG. 1. Alternatively, the service aperture 7 may be provided in a base region of a tower 2 close to a foundation near ground level. Also visible in the access panel 10 is an optional auxiliary door 90 which allows access for service personnel without requiring opening of the entire access panel 10. In aspects, of the invention a wind turbine tower 2 may comprise a tower top region and a tower base region and a longitudinally extending generally cylindrical wall 8. A tower wall 8 may in particular have a wall diameter which progressively decreases in a direction from the base region towards the top region. The tower wall 8 may have having a wall thickness which progressively decreases in a direction from the base region towards the top region. The tower 2 may in particular define an interior region within the wall 8 an exterior outwith the wall 8. The tower wall 8 is provided with a service aperture 7 in its base region, which aperture extends radially about an aperture main axis and which aperture 7 is dimensioned to allow passage therethrough of personnel and equipment between the exterior and the interior region. The tower 2 according to the invention further comprises an access panel 10 removably fixed at the tower aperture 7 as herein described or defined. Preferably, the tower wall 8 has a weather- and/or waterproof painted surface extending over substantially all the exterior region of the wall 8 adjacent the aperture 7. Preferably, the painted surface extends all around an inner rim 9 of the aperture 7 and preferably the painted surface extends about substantially all of an interior wall region 33 and exterior wall region 31 adjacent the aperture 7. FIGS. 2a and 2b show an access panel 10 generally shaped and configured to be seatingly fitted and secured at a tower service aperture 7 (shown in FIG. 3). To that end, the access panel 10 and the service aperture 7 have a generally similar shape which may be approximately oval, wherein the access panel 10 is dimensioned such that it is large enough to completely fill the service aperture 7 and to exhibit a slight radial overlap, extending over and onto the tower wall outside surface 31. The example shown in FIG. 3 is of a generally oval-shaped aperture 7 and access panel 10, wherein the opposite longitudinal sides of the oval shape are generally straight and parallel. The ends of the aperture 7 are generally curved and the access panel 10 may advantageously be correspondingly curved at its ends. As mentioned, in embodiments, there may be a small departure from a strict curved end of an access panel or portion thereof provided always that the overall extent of the access panel 10, including all its parts, is sufficient to cover the radial extent of the service aperture 7.

A view of the access panel 10 can be seen in FIG. 2a or 3 which illustrate the panel from a generally interior view. Access panel 10 is shown with an optional raised side wall 16. In embodiments, the side wall 16 of the access panel 10 may have a variable depth in order better to accommodate a possible curvature of the tower wall 8. In embodiments, a cover panel 12 of the access panel 10 may be planar, in particular, it may preferably be substantially flat. In embodiments, it may be provided with a slight curvature as suggested in FIG. 2b, equal to or less than the tower wall 8 curvature at its service aperture 7 region. Also shown in FIG. 2a or 2b is an optional facing rim 55 around the side wall 16 of the access panel 10 which may provide a broader connection surface between the access panel 10 and a tower wall 8. The facing rim 55 or simply the rim of the side wall 16 may preferably be provided with a sealing bead 57 to improve a weatherproof connection between the access panel 10 and a tower wall 8 and to prevent damage to the tower wall outer surface 31 treatment (if any) such as weatherproof paint. FIG. 2a or 2b show an elevation view of an access panel 10 with a pointed gable 110 atop the access panel 10 to deter bird-nesting tendencies which might otherwise conflict with a need to open the access panel. In this context the term "topmost" denotes the highest part of the access panel when it is in position at a tower wall aperture. Also shown are exemplary fixing elements 40, illustrated in position at the periphery of the access panel 10. The cover panel 12 is shown as a composite panel made from connected pieces of panelling. In particular, the gabling 110 is created using additional panel portions although these form part of the cover panel 12 and are not separate from it. In the illustrated embodiment, the access panel 10 comprises locators 70 for assisting with precise radial positioning of the access panel 10 in a tower aperture 7. Four locators 70 are shown by way of example, although one or two or more may suitably be provided.

Fixing elements 40 illustrated in the form of axial clamps are shown by way of example. The axial clamps 41 act to provide a fixing or clamping force generally along a clamping axis 43 (see FIG. 6), parallel to a main- or closure axis 23 of the access panel 10. Therefore, in accordance with aspects of the invention, the clamping axis 43 lies substantially parallel to the closure axis 23 of the access panel and substantially parallel to the main axis of the aperture 7, which main axis lies normal to the dominant plane of the aperture 7.

In FIG. 3, there is shown an access panel 10 from a viewpoint within the tower 2 showing a tower wall 8 interior surface 33 in a region surrounding the service aperture 7. The locators 70 are radial locators. The example which is illustrated shows four locators at a bottom edge region of the access panel 10 although in some cases a single one may suffice. Fixing elements 40 are shown connected to the access panel 10. The locators 70 allow radial adjustment of the access panel 10 such that it may be accurately positioned in the aperture 7.

Figure 5A:
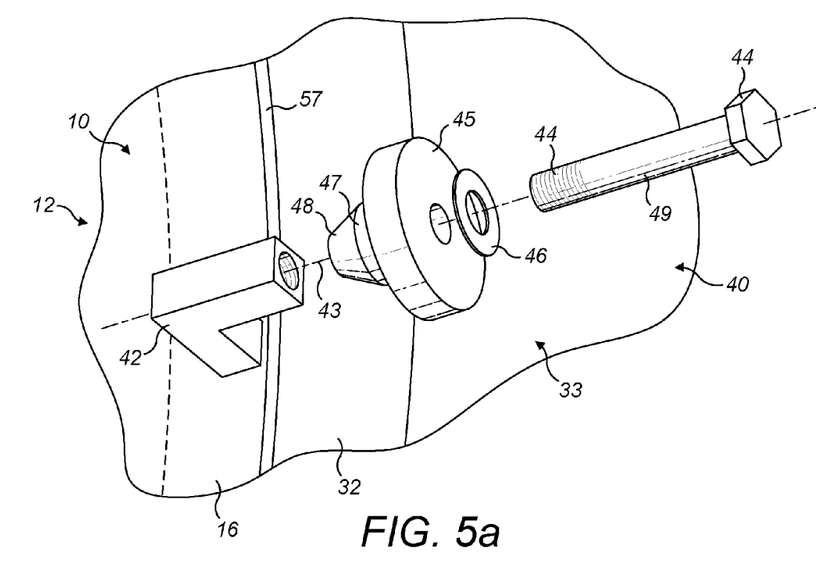
FIGS. 5a and 5b show alternative views of a fixing element according to aspects of the invention.
Figure 5B:
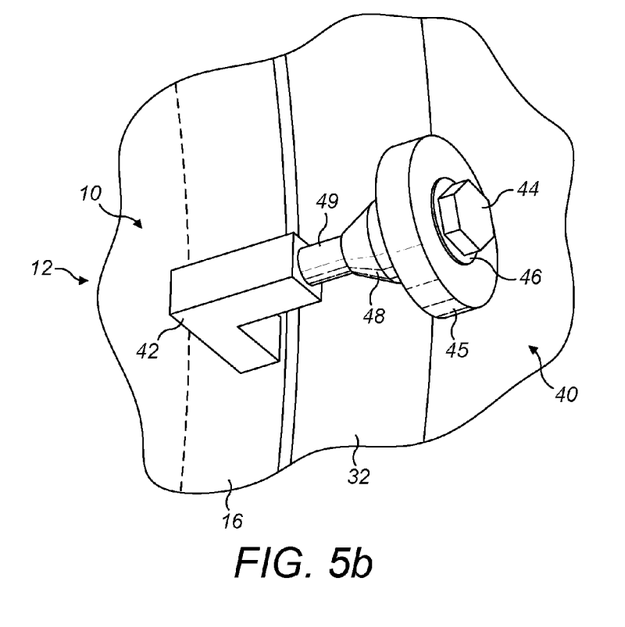
Figure 6:
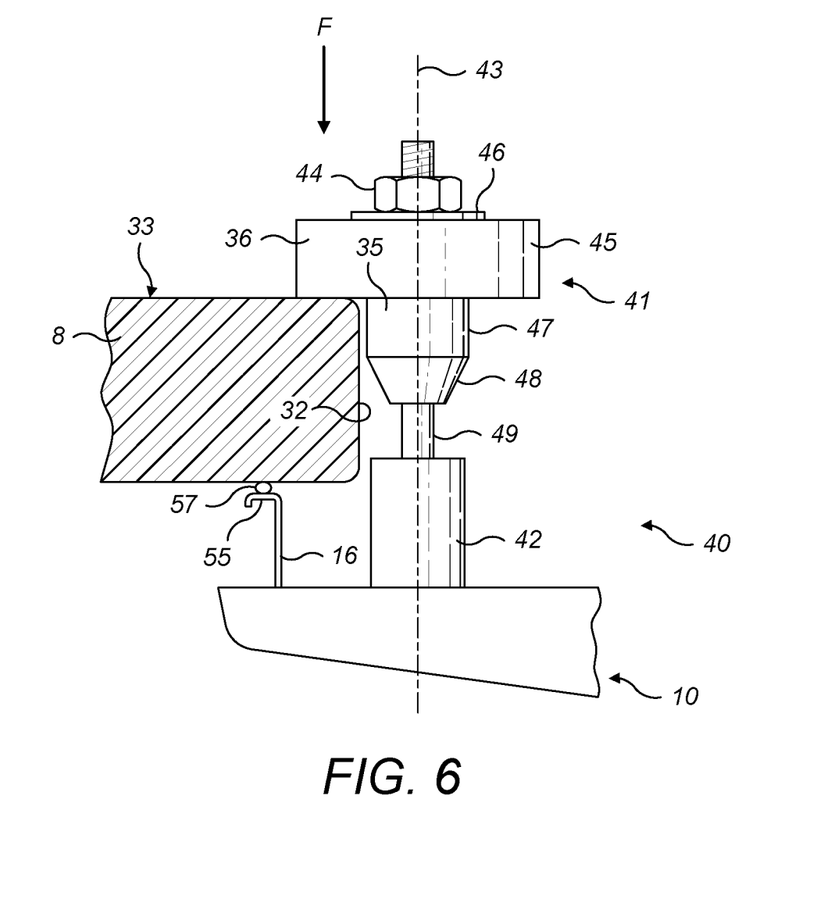
FIG. 6 shows a figurative side view of a fixing element according to aspects of the invention.
Figure 7:
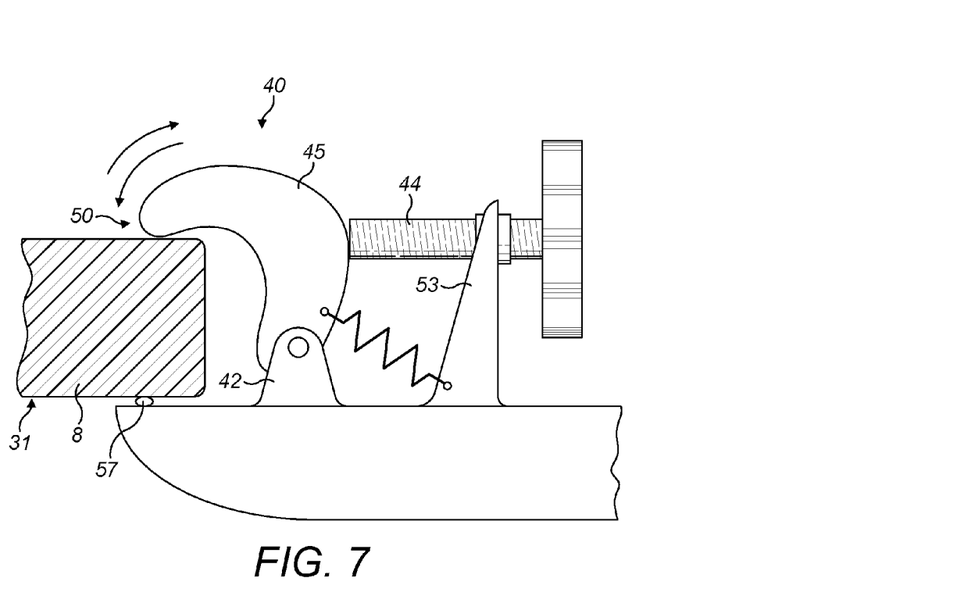
FIG. 7 shows a schematic side view of a fixing element according to aspects of the invention.
Figure 8:
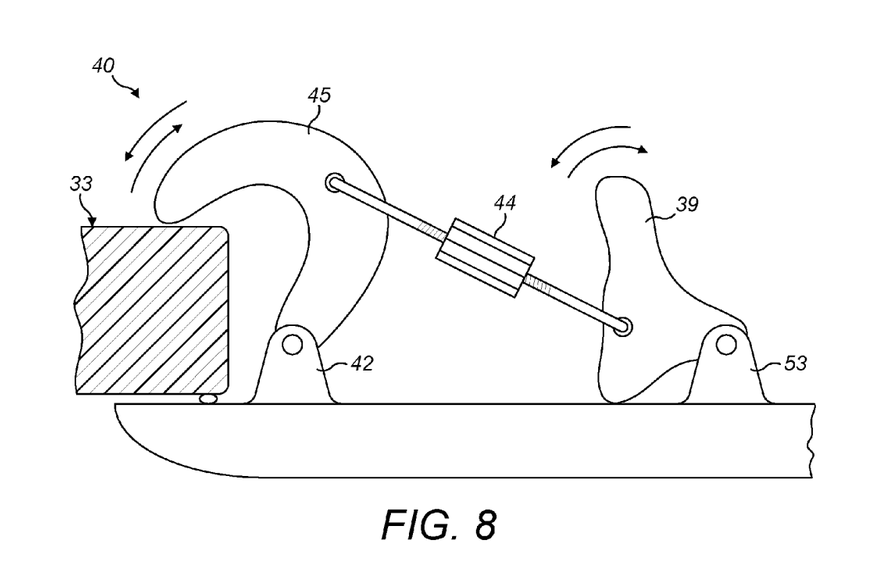
FIG. 8 shows a schematic side view of a fixing element according to further aspects of the invention.
Figure 9:
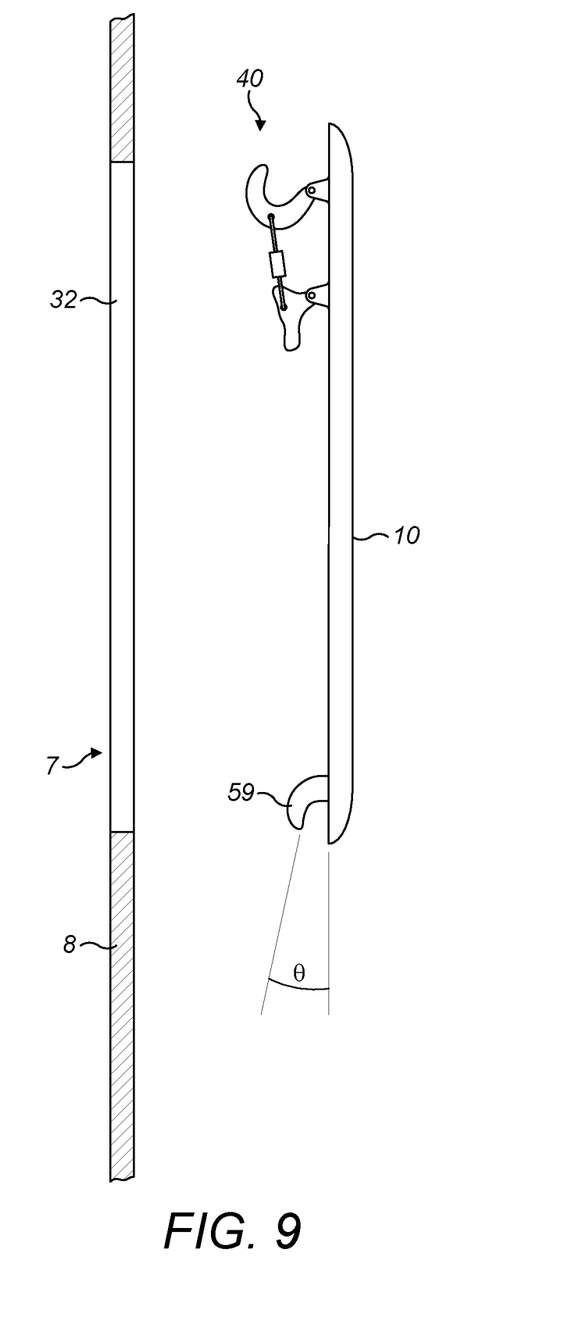
FIG. 9 shows a schematic side view of an alternative embodiment of an access panel according to aspects of the invention.
Figure 10A:
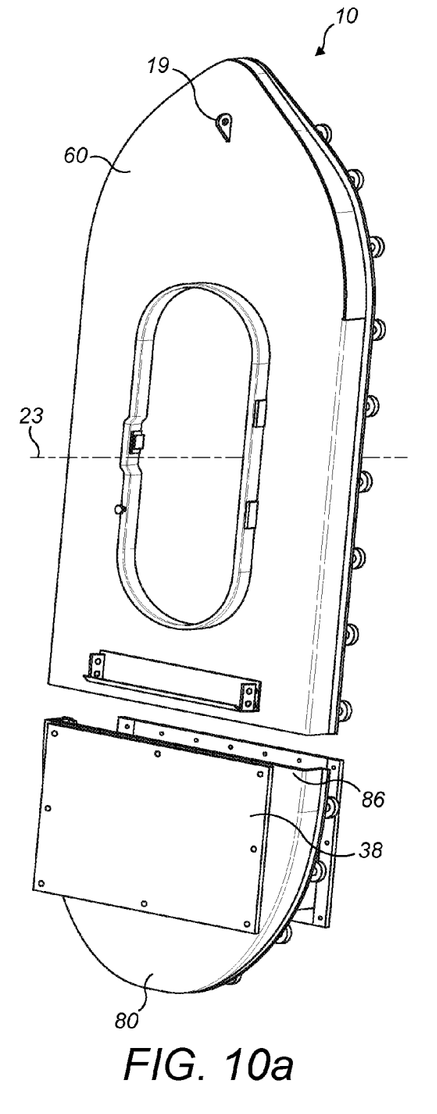
FIGS. 10a and 10b shows alternative perspective views of a schematic illustration of an access panel according to further aspects of the invention.
Figure 10B:
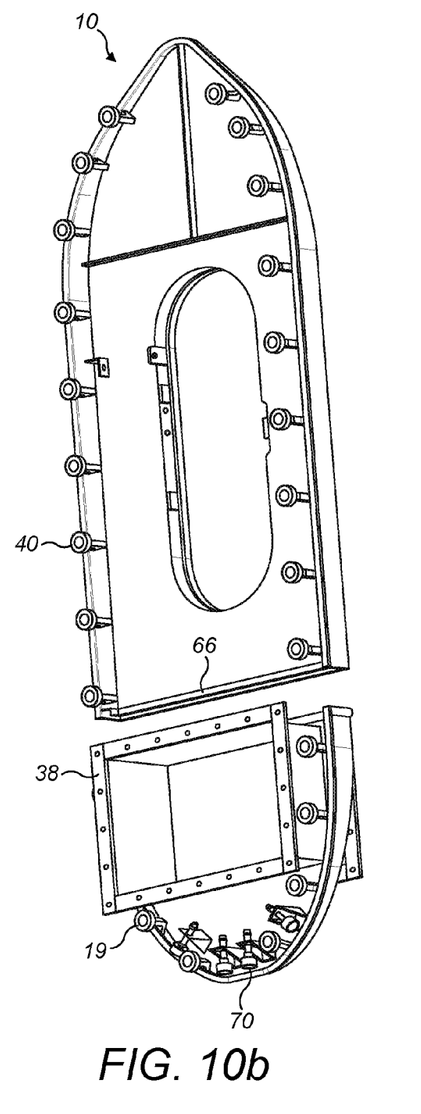

Fixing elements 40 may be axial clamps 41 as shown in more detail in FIGS. 5a, 5b and 6 although these may also be differently configured such as lever type clamps as shown for example in FIG. 7, 8 or 9. The access panel 10 is shown fixed in position at an aperture 7 in a tower wall 8 by the fixing elements 40. The access panel 10 covers the full radial extent of the service aperture 7.

From the view illustrated in FIG. 3 it can be seen that with the fixing elements 40 and locators 70 positioned on the interior surface of the access panel 10, these are therefore accessible from within the tower 2. Securing the access panel 10 in position or releasing it from its secured position may thereby advantageously be carried out from within the tower 2.

As can be appreciated from the relatively smaller dimensions of the auxiliary door 90 in relation to the service aperture 7, the door is intended for use by personnel while the dimensions of the aperture 7 allow for the passage through it of large pieces of equipment, larger than the auxiliary door dimensions. Since it is not envisaged to need frequently to move large pieces of equipment through the service aperture 7, its fixing elements 40 may be of a significantly different type than the opening mechanism of the auxiliary door 90 which may be expected to be in relatively frequent use.

A locator 70 may comprise a radially displaceable foot, capable of being moved and adjusted in a radial direction 24 of the access panel 10. The foot 74 may preferably comprise a pad made from an elastic material such as rubber or synthetic rubber and which offers a high level of friction when contacting a counter surface or when urged thereagainst. The foot is fixed to an adjustment shaft which is held in a support flange illustrated in the form of a bracket fixed or welded at its base to a part of the access panel 10. An adjuster in the form of a nut may be actuated to controllably impart a translation of the shaft in a radial direction 24. A tightening nut on the shaft may be used to tighten the foot and shaft in a retracted or extended position. In embodiments, the tightening nut may be on a side of the support opposite the actuator. The relative position of the access panel in the aperture 7 can be controllably adjusted and varied by actuating the adjuster 75 and tightening as necessary to set it in position at a relative distance from the aperture edge 32 which may in particular correspond to a predetermined position of the access panel.

Figure 4A:
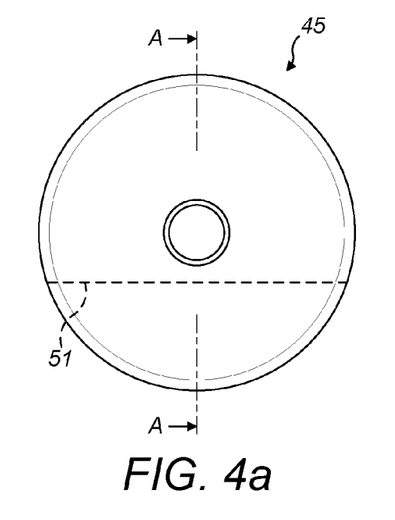
FIGS. 4a, 4b and 4c show schematic views of an exemplary clamp head according to aspects of the invention.
Figure 4B:
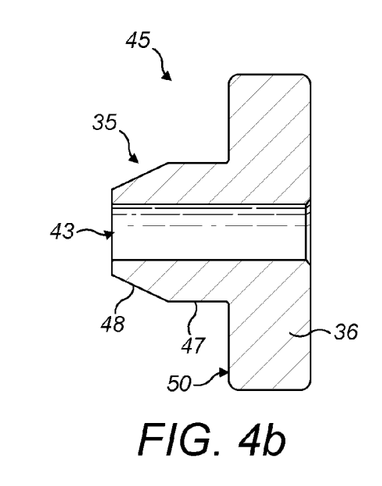
Figure 4C:
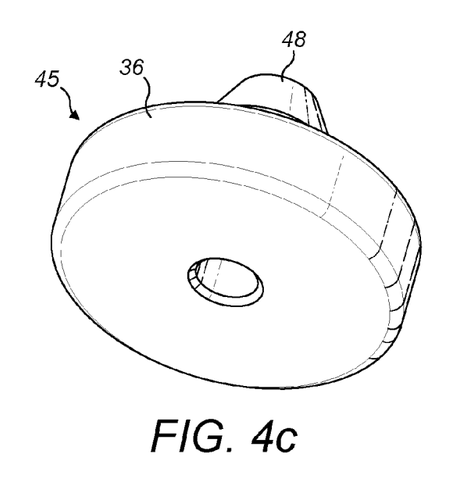

The particular design of the fixing elements 40 which are illustrated by way of example as axial clamps 41 will be discussed with reference to FIGS. 4a-c, 5a, 5b, 6 and 7. The term axial clamp is given to a clamp arrangement configured to apply a force having a component or main component generally parallel to an axial direction 43, 23 of the access panel 10 or aperture 7. In accordance with the invention, the axial force imparted by the axial clamp 41 is in the direction towards the access panel 10 or tower wall 8 thereby urging the tower wall 8 against a part of the access panel 10 which part may be a planar face of the access panel 10 or a raised wall 16 or a face 55 thereon or a sealing bead 57. An axial clamp 41 comprises an anchor 42, which in FIG. 6 is shown by way of example in the form of a boss which is fixed or welded to the access panel 10 or cover panel 12 thereof. A clamping force adjuster 44 may impart an adjustable clamping force to the axial clamp, in particular, an axial clamping force. In preferred aspects, a clamping force adjuster may be in the form of a shank with an adjustable effective length—the effective length being preferably adjustable by means of an actuator. An exemplary clamping force adjuster 44 is shown comprising a threaded shank 49 connected to the anchor 42 and provided with a nut for adjusting the clamp separation and the clamp force. In the case illustrated in FIG. 6, the anchor 42 also constitutes an anvil on which the clamping force adjuster acts. A clamping force may be imparted to a clamp head 45 which is axially movable along the shank 49 and forcibly drivable by an actuator shown by way of a nut on a thread. In some embodiments (see FIGS. 5a and 5b), the anchor 42 may be provided at a side wall 16 of an access panel 10. A clamp head 45 is shown optionally having a narrow waist 35 and a flared claw 36 with a clamping surface 50. A shank 49 has a main axis 43 which may be parallel to a closure axis or main axis of the access panel 10 or aperture 7. The clamp force actuator 44 according to the invention may be of any suitable type and capable—when actuated by a user—of controllably applying or reducing a clamping force of the clamp 41. It connects the clamp head 45 and the anchor 42 via a shank 49, an adjuster nut and a shim 46. In embodiments (FIGS. 5a and 5b), the clamp force adjuster 44 may be in the form of a threaded bolt. In the embodiment illustrated, the axial clamp 41 thereby optionally comprises a clamp force adjuster 44, a threaded part of which is also the main shank of the axial clamp 41. In the case illustrated, the clamp force adjuster 44 comprises a threaded shaft and a nut. In the case illustrated, actuation of the clamp force adjuster 44 has the dual effect of applying a clamping force—for example to a tower wall 8—via the claw portion 36 and clamping surface 50 and adjusting the effective length of the main shank 49. The clamp head 45 is preferably made of a highly resilient, elastically deformable material which is preferably deformable under clamping forces applied by manually tightening of the axial clamp 41. The clamp head 45 preferably has a smooth surface and has sufficiently low hardness and sufficient elasticity such that it is not susceptible to scratch or damage a coating on the surface of the tower wall 8. The waist 35 presents an axially extending alignment surface 47 which serves to radially position the access panel 10 against an edge face 32 of the service aperture 7. Detail of an exemplary clamp head 45 having a distal flange portion 36 and a proximal waist 35 is shown in FIGS. 4a-c, in which FIG. 4b shows a section along A-A in FIG. 4a while FIG. 4c shows a perspective view. The illustrated clamp head 45 has rotational symmetry about its central axis 43 which runs through a central bore. This provides the advantage that the clamp head 45 is always correctly oriented in relation to a surface to be clamped, irrespective of its momentary orientation. In one optional aspect, the distal flanged portion 36 of the clamp head 45 may be truncated between two points on its radial outermost surface, along a chord 51 to allow easier insertion of the access panel 10 into an aperture 7, without requiring to remove the clamp heads 45 from their respective shanks 49.

Advantageously, the clamp head 45 further comprises an axially tapered surface 48 adjacent and extending radially inward of the alignment surface 47. Thus when the clamp head 45 is drawn axially along the shank 49 towards the anchor 42 in which the shank 49 is held, the tapered surface 48 engages with the inner rim 9 of the tower wall aperture 7 and is caused to slide over it while at the same time pushing the access panel 10 into its intended position. The clamp head preferably exhibits rotational symmetry about its main axis 43 which coincides with a main longitudinal axis of a clamp shank 49.

In operation, a clamping face 50 of the claw 36 abuts against the interior surface 33 of the tower wall 8. The force adjuster 44 may be actuated by tightening it to put the shank 49 under tension and transmit a clamping force 'F' to an interior surface 33 of the tower wall aperture region. In the case illustrated, the clamping force may be a shear force F in relation to the clamp head 45. The claw 36 thereby serves to pull the access panel 10 securely to abut and rest against the outside surface 31 of the tower wall 8. A sealing bead 57 at the access panel 10 side wall 16 may provide an improved weather proof connection of the access panel 10 when it is fixed and secured in position. As can be seen in FIGS. 4a-c, in one exemplary aspect, the clamp head 45 comprises an element made from a single part and including a flanged distal portion 36. The clamp head of the invention need not be in one piece although there are advantages to such a configuration especially if a single material is used which exhibits enough resilience to maintain its integrity under clamping loads without requiring a strengthening cage or possible external reinforcing plate. A compound clamp head 45 may fall inside the scope of the invention, unless otherwise stated. This may in particular allow a combination of material properties to be combined. One-piece clamp heads 45 may be preferred in some embodiments.

FIGS. 7 and 8 show alternative constructions for a fixing element 40 comprising a resilient deformable part of a clamp head 45 being in a 'C' shape with a distal finger providing a clamping surface 50 and the body of which is shaped to exhibit elastic deformability in particular while urged against an interior face 33 of a tower wall 8. A clamp force adjuster 44 is shown in the form of a shaft whose effective length between an anvil 53 and a portion of the clamp head 45 is adjustable by means of a thread type adjuster. In the embodiment of FIG. 8, the clamp head 45 can be rapidly engaged with a tower wall 8 when the access panel 10 is put in position in an aperture 7 by actuating a lever or rocker type engagement control 39. The force adjuster may be adjusted after bringing the clamp head across into its clamping position or it may be pre-adjusted beforehand by rotating an adjuster nut bridging two shank portions of the force adjuster 44.

In a further exemplary embodiment, an access panel 10 may comprise a catch 59 preferably made from a resilient deformable material as defined herein and having an angled lip at a shallow angle θ thereby to enable the access panel to be slotted into position over the edge of an aperture 7 at a tower wall 8 and to automatically find its seating. The access panel 10 may preferably comprise one or two or more quick closure clamps 40 as shown in more detail in FIG. 5b allowing the clamp head 45 to be retracted away from the edge of the access panel 10 for quick insertion and fixing in position by actuating engagement control 59.

According to aspects of the invention, fixing elements 40 enable the access panel 10 to be secured in place at the aperture 7 preferably without requiring holes to be drilled in the tower wall 8 or welds to be applied thereto. Therefore, in further optional aspects, the tower wall 8, at a region adjacent the service aperture 7, for example within 1 m of the aperture edge face 32, comprises neither through-holes nor structural welds. In this context, a structural weld may be a weld which directly or indirectly supports the weight of the access panel 10 or at least a substantial or major part of it. Advantageously therefore, in a tower 2 according to aspects of the invention, there may be no structural welds on the tower wall 8 or no large welds or no welds of any kind.

In a further embodiment of the invention, aspects of which are shown in FIGS. 9a and 9b, an access panel 10 may comprise a main panel 60 and a sub-panel 80. These two elements may abuttingly connect along a common non-fixed seam defining an abutting contact boundary between the two panels of the access panel. The sub-panel 80 is shown here with a ventilation aperture 38 by way of optional additional feature. In some embodiments no such ventilation aperture 38 may be provided, or it may be provided elsewhere in the tower 2. A hoisting point 19 is illustrated on the main panel 60 of the access panel 10. The illustrated exemplary hoisting point 19 allows the main panel 60 to be suspended in a more or less vertical orientation when hoisted by a lifting device such as a crane (not shown).

The main panel 66 has a reference surface 66 provided in the form of a groove, thereby configured to co-operate with a projecting bearing surface 86 of a sub-panel 80 which may seatingly engage inside the groove 66.

The access panel 10 extends radially about a main axis 23 which may also be called a closure axis. It denotes an axis normal to the plane of the access panel 10. It may be coincident with the main axis of a tower wall aperture 7 when fitted in position thereat. The generally planar access panel 10 extends generally radially about the main axis 23. The number and distribution of the axial clamps 41 may be varied according to circumstances such as according to the overall size of the access panel 10. In addition, the sub-panel 80, is shown having radial locators 70 which are adjustable in a generally radial direction 24 of the access panel 10 and thereby also in a radial direction of the sub-panel 80. Adjustment of the locators 70 moves a foot of the locator 70 in a radial direction 24, that is to say in a direction generally outward or outboard from the sub-panel 80 and generally parallel to the dominant plane of the sub-panel 80. It may lie parallel to the dominant plane of a tower wall service aperture 7, when the access panel 10 is fitted therein.

As mentioned, the bearing surface 86 of the sub-panel 80 is configured to co-operate with and to connect with a correspondingly shaped reference surface 66 provided along one edge of the main panel 60. The connected, co-operating bearing and reference surface thereby constitute a seam. For improved weatherproofing, a sealing bead may optionally be provided along the seam. The configuration of the respective bearing and reference surfaces 86, 66 may be varied to be overlapping or engaging if desired. Preferably, the sub-panel 80 bearing surface 86 presents a support and locating surface for the main panel 60. The precise seating of the sub-panel 80 may be carried out by adjusting the locators 70 such that the bearing surface 86 is positioned accurately in a predetermined bearing position within the aperture 7. In the example illustrated, the bearing surface 86 may extend, in its predetermined position, substantially across a curved end region of the aperture 7. In preferred aspects, the bearing surface 86 may be substantially planar although a surface with a slight curvature such as a concavity may assist rapid seating of a corresponding reference surface 66.

During use, when installing an access panel 10 according to FIG. 9a or 9b at the service aperture 7 of a wind turbine tower 2, a bearing surface 86 is pre-established in the aperture 7 by positioning a sub-panel 80 of the access panel 10 such that its bearing surface 86 adopts a predetermined and fixed bearing position in the aperture 7. This operation can be carried out using relatively modest equipment or tools because the dimensions of the sub-panel 80 may be relatively manageable. In most instances, a sub-panel may be expected not to exceed a maximum dimension of about 1 or 2 meters across. If made of a lightweight material such as aluminium, it may be light enough to be handled into position at a tower wall aperture 7 by one or two service personnel. Adjustments to its portion can also be carried out manually using hand held tools and by one or two members of service personnel. Also a fixing operation of the sub-panel 80, once its bearing surface has adopted the predetermined desired relative position in the aperture 7, preferably using fixing elements such as axial clamps 41 described herein, may be carried out by one or two service personnel and hand held tools. A reasonably precise positioning of the sub-panel may be of importance in ensuring a durable and weatherproof fit of the access panel 10 over a service aperture 7. Moreover, in embodiments in which an auxiliary door 90 is provided encompassed in the access panel 10, there is a need for the access panel 10 to be robustly held in position in order to sustain physical usage of the door 90 repeatedly over time. For fixing the sub-panel in position, any appropriate fixing means 40 may be contemplated, including quick-fasteners such as hinged lever type sprung fasteners, latching dogs or other suitable types of clasp or clamp.

Once the sub-panel 80 is securely in position, the much larger main panel 60 may be more swiftly brought into position. Given its considerably larger size and greater weight, the main panel 60 is expected to be suspended from a crane (not shown) by a hoisting point 19 during installation. The size of the main panel 60 makes it not only heavy but susceptible to be caught by gusts of wind making bringing it into position in the aperture 7 particularly difficult, especially under windy conditions. While suspended from the crane, its reference surface 66 may be easily abutted against the bearing surface 86 of the sub-panel 80. The predetermined adjusted position of the bearing surface 86 is measured to take account of the respective, know dimensions of the aperture 7 and of the main panel 60. When the reference surface 66 abuts the bearing surface, a previously determined acceptable fit of the main panel 60 and thereby of the access panel 10 as a whole at the aperture 7 is easily guaranteed without further operations or adjustments. In aspects of the invention, the reference surface 66 and the bearing surface 86 may be configured to mutually interlock such as in a tongue-and groove type arrangement which adds to the effectiveness of the operation of fittingly connecting the two elements. After positioning the main panel 60, it can be fixed using any suitable fixing elements 40 as discussed in relation to the sub-panel and examples of which are described or defined herein. The axial clamps 41 specifically described herein may provide an additional measure to enhance the fit of the main panel 60 and access panel 10 as a whole, such as an axially tapered portion of a surface which abuts a service aperture wall edge surface 32.

When moving large components such as a transformer or other pieces of equipment though the tower wall service aperture 7, the aperture 7 can be opened by removing the main panel 60 of the access panel using a crane as described previously, while leaving the sub-panel 80 in place. After completing moving of large components, the aperture 7 may be swiftly closed again without requiring alignment in relation to the aperture 7 because the bearing surface 86 of the sub-panel 80 provides the requisite guidance into position. The access panel 10 according to the invention is thereby easier to install and easier to operate when needed.

As described herein, a set of fixing elements 40 is provided at an access panel 10 which fixing elements 40 allow the access panel 10 to be fixed in place, secured, and operated when the access panel 10 is required to be removed, all without weakening the tower wall 8 and without damaging weatherproof coatings thereon. Thereby, the tower access aperture 7 may be configured without a structural aperture frame—in other words, the tower aperture 7 may have a non-structural aperture frame. Similarly, the access panel 10 according to aspects of the invention may preferably be non-structural in relation to the tower 2.

As will be appreciated, in some aspects presented herein, the access panel 10 of the present invention may be suitable for implementation in outdoor structures other than wind turbines and into which access is occasionally required for personnel or equipment and in which fitting of the access panel or provision of a wall aperture may present similar challenges to those described herein in the context of wind turbine towers.

As will be appreciated, in some aspects presented herein, the access panel of the present invention may be suitable for implementation in outdoor structures other than wind turbines and into which access is occasionally required for personnel or equipment and in which fitting of the access panel or provision of a wall aperture may present similar challenges to those described herein in the context of wind turbine towers.

The invention claimed is:

1. Wind turbine tower access panel, which panel is removably fixable at a service aperture in a tower wall to thereby close said aperture;
    said access panel being generally planar and extending radially about an axis normal thereto,
    said access panel comprising a set of two or more fixing elements configured to securely fix said access panel in place at a said aperture;
    wherein each said fixing element comprises an axial clamp, said clamp comprising an anchor fixed to said access panel, a clamping force adjuster and a clamp head having a clamping surface;
    said clamp head comprising a relatively deformable resilient material which deforms under an applied clamping load of said clamp thereby applying a clamping force to said tower wall, wherein said clamp head includes an axial bore and wherein said clamping force adjuster passes through said axial bore and completely through said clamp head.

2. Wind turbine tower access panel, which panel is removably fixable at a service aperture in a tower wall to thereby close said aperture;
    said access panel being generally planar and extending radially about an axis normal thereto,
    said access panel comprising a set of two or more fixing elements configured to securely fix said access panel in place at a said aperture;
    wherein each said fixing element comprises an axial clamp, said clamp comprising an anchor fixed to said access panel, a clamping force adjuster and a clamp head having a clamping surface;
    said clamp head comprising a relatively deformable resilient material which deforms under an applied clamping load of said clamp thereby applying a clamping force to said tower wall, wherein said clamping force adjuster defines a clamping axis, and wherein the clamping axis does not intersect said clamping surface of said clamp head.

3. The access panel according to claim 2, wherein said clamping surface comprises said deformable clamp head material.

4. The access panel according to claim 2, wherein said clamp head surface material has a Shore D hardness less than 95 or a Rockwell R hardness less than 130.

5. The access panel according to claim 2, said deformable clamp head material having a shear modulus less than 10 GPa.

6. The access panel according to claim 2, said deformable clamp head material comprising a plastics material having a shear modulus less than 6 GPa and an elastic modulus less than 4 GPa.

7. The access panel according to claim 2, wherein said clamp head exhibits a distal, enlarged, flanged claw portion and a proximal, reduced, waist portion.

8. The access panel according to claim 7, said waist portion comprising an axially extending first surface and an axially tapered second surface.

9. The access panel according to claim 7, wherein said deformable clamp head material comprises a single piece which exhibits said distal enlarged flanged claw portion and said proximal reduced waist portion.

10. The access panel according to claim 2, wherein said clamp is configured to apply a shearing force to said clamp head during a clamping action of said access panel to a said tower wall.

11. The access panel according to claim 2, said clamp head being rotationally symmetrical about an axis of symmetry.

12. The access panel according to claim 2 wherein said clamp force adjuster comprises a shank having an effective length between said clamping head and an anvil of said axial clamp and wherein said clamping force adjuster further comprises an actuator capable of varying the effective length of said shank.

13. The access panel according to claim 2, said access panel comprising a main panel and a separate sub-panel, said main- and sub-panels being configured for separate positioning into or removal from a said tower aperture.

14. Wind turbine tower comprising a longitudinally extending generally cylindrical wall said tower defining an interior region within said wall and an exterior outwith said wall;
  said tower wall being provided with a service aperture in its base region, which aperture extends radially in said wall about an axis normal thereto and is dimensioned to allow passage of personnel and equipment between said exterior and said interior region;
  wherein said tower further comprises an access panel removably fixed at said tower aperture;
  said access panel being an access panel according to claim 2.

15. The wind turbine tower according to claim 14, said tower wall being a steel wall and wherein said set of fixing elements of said access panel securely fix said panel in place at said aperture without requiring holes and/or welds in said tower wall.

16. A method of fixing an access panel according to claim 12, to a service aperture through a wall of a wind turbine tower;
  said aperture extending radially about a main axis; and
  said method comprising placing said access panel fittingly in said aperture; and applying an axial clamping force between said access panel and said tower wall aperture by operating said clamping force adjuster, such that said access panel is securely fixed to said tower wall aperture without damaging said tower wall or a coating thereon.

17. Wind turbine tower access panel, which panel is removably fixable at a service aperture in a tower wall to thereby close said aperture;
  said access panel being generally planar and extending radially about an axis normal thereto,
  said access panel comprising a set of two or more fixing elements configured to securely fix said access panel in place at a said aperture;
  wherein each said fixing element comprises an axial clamp, said clamp comprising an anchor fixed to said access panel, a clamping force adjuster and a clamp head having a clamping surface;
  said clamp head comprising a relatively deformable resilient material which deforms under an applied clamping load of said clamp thereby applying a clamping force to said tower wall,
  wherein said clamp head exhibits a distal, enlarged, flanged claw portion and a proximal, reduced, waist portion, wherein said claw portion is distal relative to said anchor and wherein said waist portion is proximal relative to said anchor.

18. The access panel according to claim 17, wherein said anchor opposes said clamping surface of said clamp head.

19. Wind turbine tower access panel, which panel is removably fixable at a service aperture in a tower wall to thereby close said aperture;
  said access panel being generally planar and extending radially about an axis normal thereto,
  said access panel comprising a set of two or more fixing elements configured to securely fix said access panel in place at a said aperture;
  wherein each said fixing element comprises an axial clamp, said clamp comprising an anchor fixed to said access panel, a clamping force adjuster and a clamp head having a clamping surface;
  said clamp head comprising a relatively deformable resilient material which deforms under an applied clamping load of said clamp thereby applying a clamping force to said tower wall,
  wherein said clamp force adjuster comprises a shank having an effective length between said clamping head and an anvil of said axial clamp and wherein said clamping force adjuster further comprises an actuator capable of varying the effective length of said shank, wherein said anvil opposes said clamping surface of said clamp head, and wherein the effective length of said shank extends from said clamping head to said anvil.

20. The access panel according to claim 2, said deformable clamp head material having an elastic modulus less than 12 GPa.

* * * * *